(12) United States Patent
Wentland et al.

(10) Patent No.: US 10,364,965 B1
(45) Date of Patent: Jul. 30, 2019

(54) SYSTEM AND FASTENER FOR COUPLING A LIGHT-EMITTING DEVICE TO A COMPOSITE PANEL ASSEMBLY

(71) Applicant: The Boeing Company, Chicago, IL (US)

(72) Inventors: Mark E. Wentland, Lynnwood, WA (US); Zachary A. Connaughton, Shoreline, WA (US); Kenneth M. Reynolds, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/954,559

(22) Filed: Apr. 16, 2018

(51) Int. Cl.
| | |
|---|---|
| *F16B 13/02* | (2006.01) |
| *F16B 45/00* | (2006.01) |
| *F21V 19/00* | (2006.01) |
| *F21Y 115/10* | (2016.01) |

(52) U.S. Cl.
CPC ............ *F21V 19/002* (2013.01); *F16B 13/02* (2013.01); *F16B 45/00* (2013.01); *F21Y 2115/10* (2016.08)

(58) Field of Classification Search
CPC ........ F21V 19/00; F21V 19/002; F21V 21/00; F21V 21/10; F21V 21/14; F21V 17/00; F21S 8/08; F21S 6/00; E04H 12/00; F16B 13/02; F16B 45/00; F21Y 2115/10
See application file for complete search history.

(56) References Cited

U.S. PATENT DOCUMENTS

| | | | | |
|---|---|---|---|---|
| 7,559,673 | B2 * | 7/2009 | Meersman | G09F 9/30 362/245 |
| 10,151,462 | B1 * | 12/2018 | Satterfield | F21V 21/048 |
| 2005/0007791 | A1 * | 1/2005 | Helbach | F21S 8/02 362/555 |
| 2009/0059610 | A1 * | 3/2009 | Marshall | F21K 9/00 362/470 |
| 2017/0136944 | A1 | 5/2017 | Duce et al. | |
| 2017/0142523 | A1 | 5/2017 | Schalla et al. | |

OTHER PUBLICATIONS

Co-pending U.S. Appl. No. 15/635,831, filed Jun. 28, 2017.

* cited by examiner

*Primary Examiner* — Joseph L Williams
*Assistant Examiner* — Jose M Diaz
(74) *Attorney, Agent, or Firm* — McDonnell Boehnen Hulbert & Berghoff LLP

(57) ABSTRACT

In an example, a fastener for coupling a light-emitting device to a composite panel assembly is described. The fastener includes a fastener head including an anchor portion and a retainer portion. The fastener also includes a plug extending from the anchor portion of the fastener head. The plug includes an axial retention structure configured to axially retain the plug in a bore of a composite panel assembly. The retainer portion extends as a cantilever structure from the anchor portion. The retainer portion is configured to press a light-emitting device toward a light-transmission channel of the composite panel assembly when the plug is axially inserted in the bore of the composite panel assembly.

20 Claims, 10 Drawing Sheets

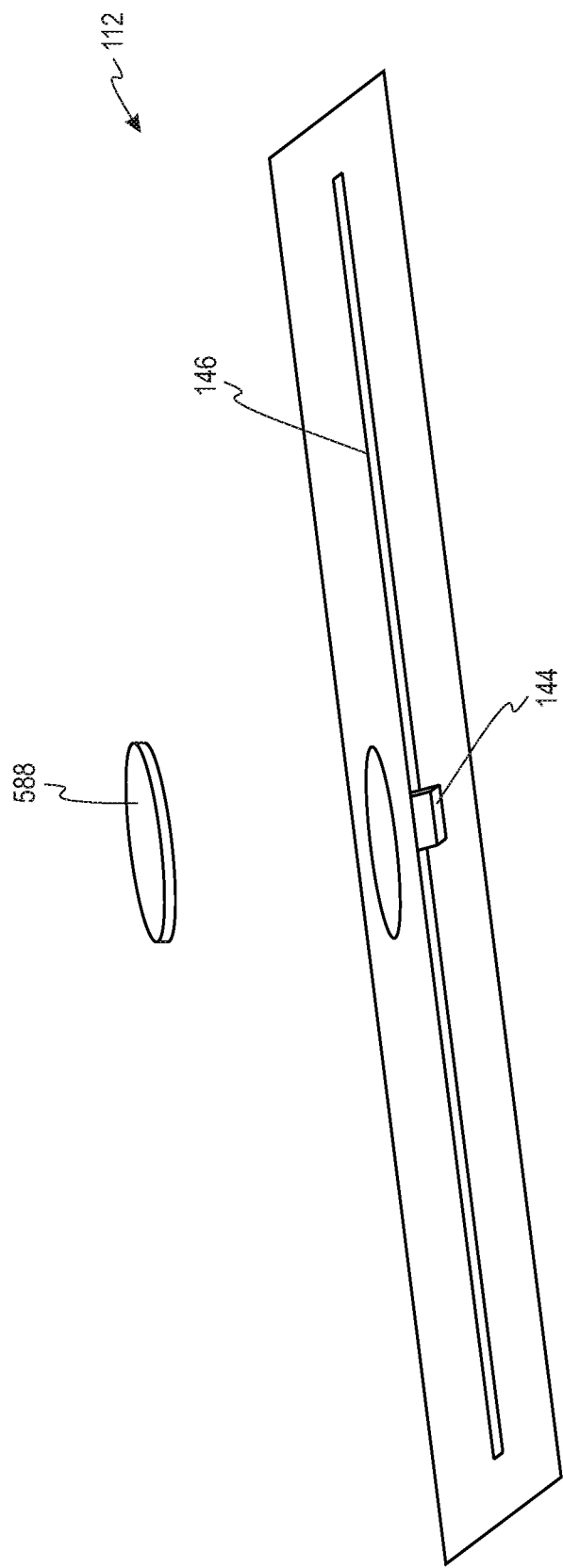

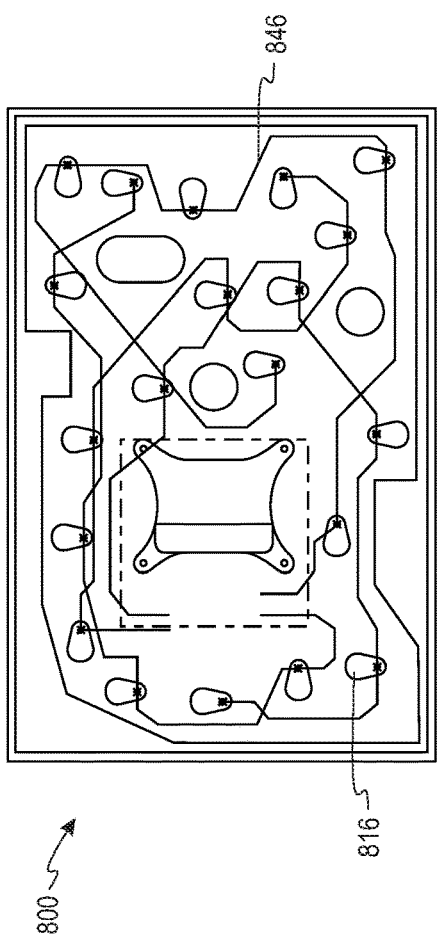
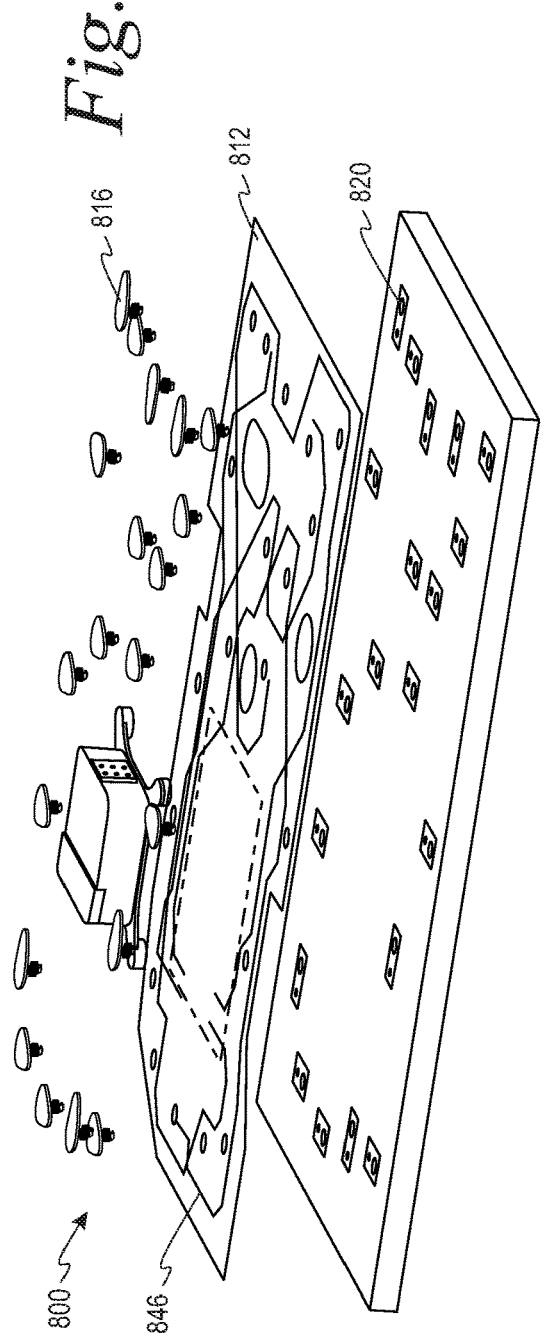
Fig. 8A
Fig. 8B

SYSTEM AND FASTENER FOR COUPLING A LIGHT-EMITTING DEVICE TO A COMPOSITE PANEL ASSEMBLY

FIELD

The present disclosure generally relates to attachment components, and more specifically to a system and a fastener for coupling an electrical component to a composite sandwich panel.

BACKGROUND

In various applications, it may be useful to mechanically and/or electrically couple an electrical component to a panel (e.g., a composite sandwich panel) or a similar structure. The electrical component may take the form of a light source, a light emitting diode (LED), a sensor, a button, a switch, or an actuator. For example, a technician may secure the electrical component within a hole having a desirable position relative to other components attached to the panel or in a position that is convenient for a user. To this end, a technician may solder electrical leads of the electrical component to wiring that is attached to the panel. Additionally, the technician may bond the electrical component to the hole in the panel with adhesive.

SUMMARY

In an example, a fastener for coupling a light-emitting device to a composite panel assembly is described. The fastener includes a fastener head including an anchor portion and a retainer portion. The fastener also includes a plug extending from the anchor portion of the fastener head. The plug includes an axial retention structure configured to axially retain the plug in a bore of a composite panel assembly. The retainer portion extends as a cantilever structure from the anchor portion. The retainer portion is configured to press a light-emitting device toward a light-transmission channel of the composite panel assembly when the plug is axially inserted in the bore of the composite panel assembly.

In another example, a system is described that includes a composite panel assembly, a printed electronics sheet, and a fastener. The composite panel assembly includes a composite sandwich panel, which includes a core between a first skin and a second skin. The composite sandwich panel defines a hole extending through the first skin, the core, and the second skin. The composite panel assembly also includes an insert in the hole of the composite sandwich panel. The insert defines a light-transmission channel. The composite panel assembly further includes a bore in at least one of the composite sandwich panel or the insert.

The printed electronics sheet includes a light-emitting device at the light-transmission channel. The fastener includes a fastener head and a plug. The fastener head includes an anchor portion and a retainer portion. The plug extends from the anchor portion of the fastener head and couples the fastener to the bore of the composite panel assembly. The retainer portion presses the light-emitting device toward the light-transmission channel to assist in retaining the light-emitting device at the light-transmission channel.

In another example, a system is described that includes a composite sandwich panel, an insert, a printed electronics sheet, and a fastener. The composite sandwich panel includes a core between a first skin and a second skin. The composite sandwich panel defines a hole extending through the first skin, the core, and the second skin. The insert is in the hole of the composite sandwich panel and defines a light-transmission channel. The insert includes a first section in the hole of the composite sandwich panel and a second section extending above the first skin of the composite sandwich panel.

The printed electronics sheet includes a light-emitting device at the light-transmission channel. The printed electronics sheet defines a plurality of apertures on opposing sides of the first section of the insert. The fastener includes a retainer portion and a plurality of resilient arms. Each resilient arm extends through a respective one of the plurality of apertures in the printed electronics sheet and couples the fastener to the second section of the insert. The retainer portion presses the light-emitting device toward the light-transmission channel to assist in retaining the light-emitting device at the light-transmission channel.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

FIG. 5 illustrates a partially exploded view of a printed electronics sheet, according to an example embodiment.

FIG. 8A illustrates a plan view of a system, according to an example embodiment.

FIG. 8B illustrates a partially exploded view of the system of FIG. 8A, according to an example embodiment.

DETAILED DESCRIPTION

Figure 1A:
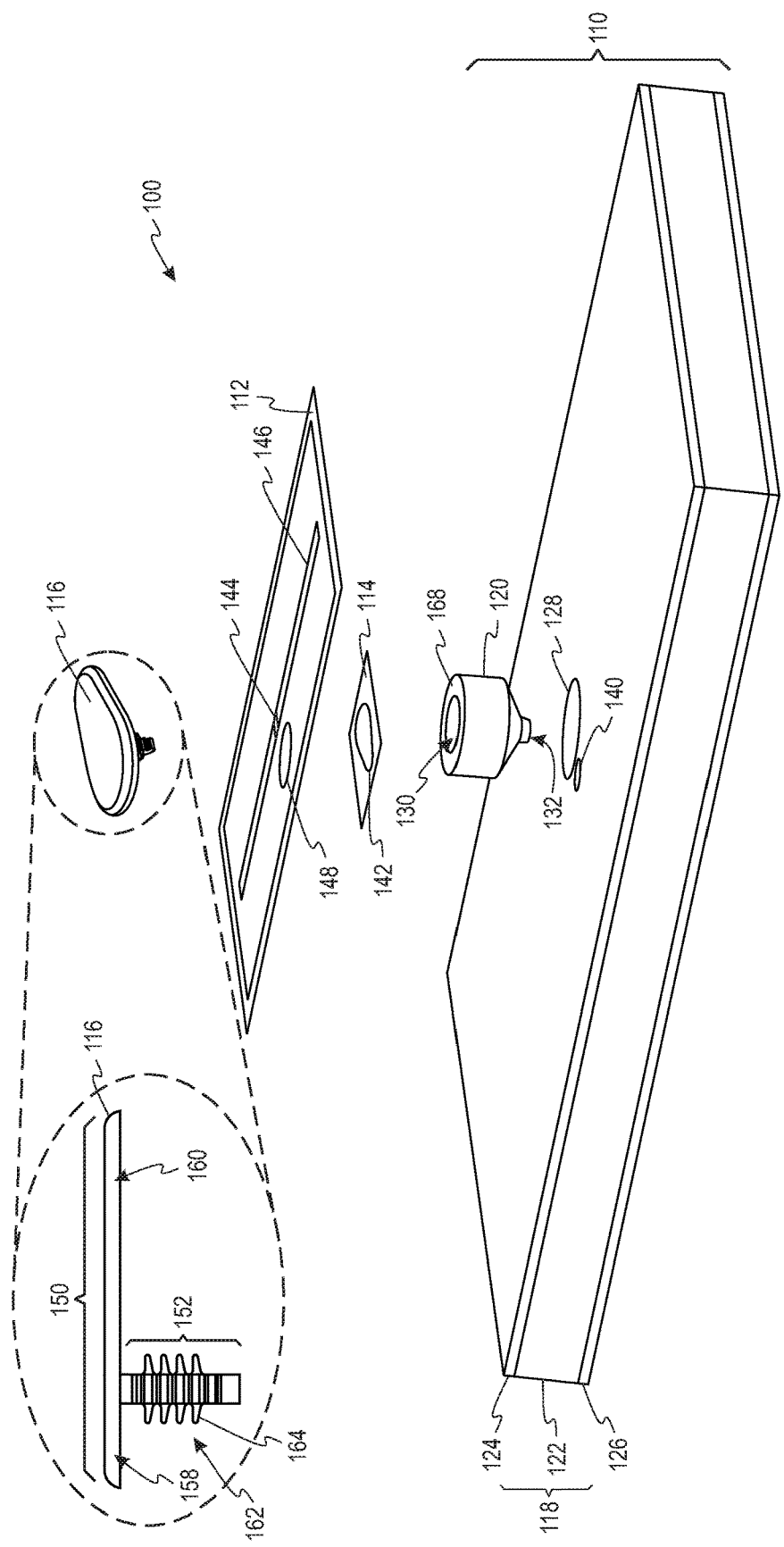
FIG. 1A illustrates an exploded view of a system, according to an example embodiment.

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

By the term "approximately" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As noted above, a conventional approach to coupling an electrical component to a composite sandwich panel involves soldering electrical leads of the electrical component to wiring that is attached to the panel, and bonding the electrical component to the hole in the panel with adhesive. This approach to coupling the electrical component to the composite sandwich panel may have some disadvantages. For instance, it generally requires considerable time and effort for the technician to apply an adhesive to the hole in the panel and/or the electrical component, wait for the adhesive to dry, and perform the soldering. Additionally, the weight of the electrical component may be too large to be reliably supported by an adhesive bond to the hole having a surface area limited by the thickness of the panel. Another drawback is that the electrical component, once adhesively bonded to the panel, is generally not removable without altering the panel. Further still, wire routing and securing can take a great deal of time. Also, accurately capturing exact wire routing paths and wire lengths can present challenges for managing wire inventory and supply.

Example systems and methods described herein can beneficially address at least some drawbacks of existing approaches to coupling the electrical component to the composite sandwich panel. Within examples, a system can include a composite panel assembly, a printed electronics sheet, and a fastener. The composite panel assembly can include a composite panel sandwich and an insert in a hole defined by the composite panel sandwich. The insert can define a light-transmission channel through the composite panel sandwich.

The printed electronics sheet can include a light-emitting device and one or more conductive traces for coupling the light-emitting device to a power source. The printed electronics sheet can be positioned on the composite panel assembly such that the light-emitting device is aligned with the light-transmission channel.

The fastener can be coupled to the composite panel assembly to retain the light-emitting device in a desired position relative to the light-transmission channel. For instance, in one example, the fastener can be inserted in a bore in the composite panel sandwich adjacent to the insert, and extend in a cantilevered manner over the light-emitting device to press the light-emitting device toward the light-transmission channel. In another example, the fastener can be inserted in a bore in the insert, and extend in a cantilevered manner over the light-emitting device to press the light-emitting device toward the light-transmission channel. With the fastener extending over the light-emitting device in a cantilevered manner, the fastener can help to evenly distribute pressure over the light-emitting device while inhibiting (or preventing) ingress of moisture, dirt, and/or dust into the light-transmission channel.

In some examples, the fastener can be coupled to the composite panel assembly by an axial movement without requiring rotation of the fastener relative to the composite panel assembly. This can beneficially facilitate assembling the system in a relatively easy and rapid manner as compared to the conventional approach for coupling an electrical component to a composite sandwich panel described above.

Figure 1B:
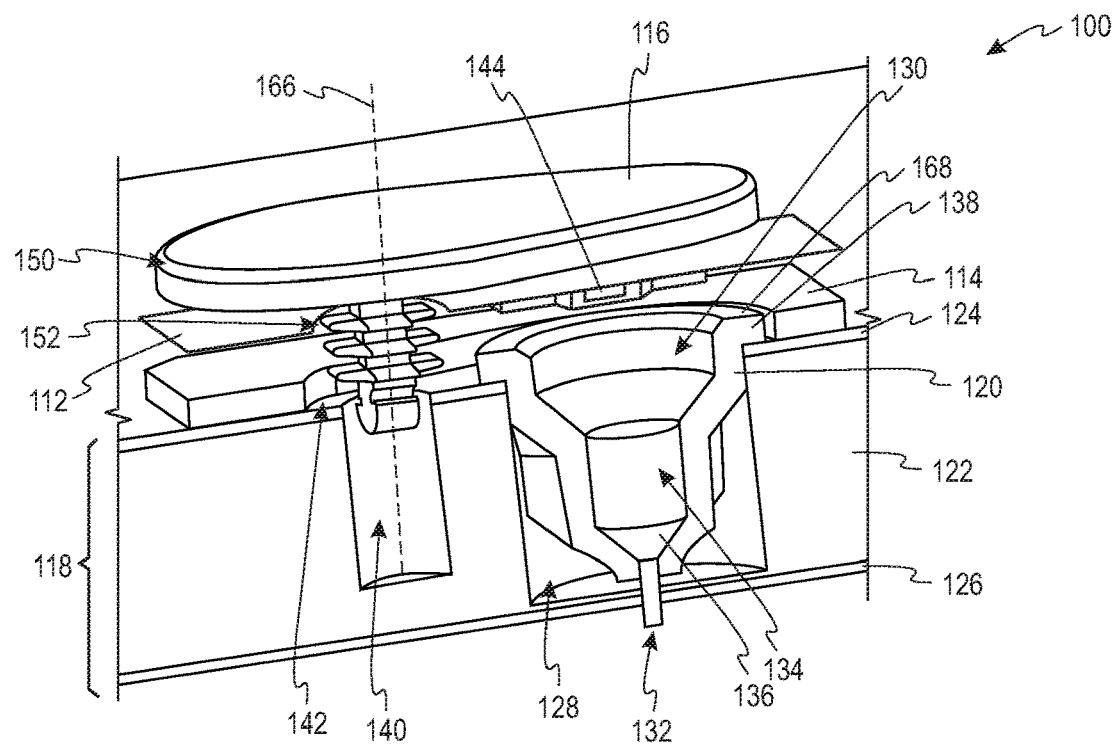
FIG. 1B illustrates a partial cross-sectional view of the system of FIG. 1, according to an example embodiment.

Referring now to FIGS. 1A-1B, a system 100 is depicted according to an example embodiment. More specifically, FIG. 1A depicts an exploded view of the system 100, and FIG. 1B depicts a partial cross-sectional view of the system 100 in a partially assembled state according to the example embodiment. As shown in FIGS. 1A-1B, the system 100 includes a composite panel assembly 110, a printed electronics sheet 112, a gasket 114, and a fastener 116.

The composite panel assembly 110 includes a composite sandwich panel 118 and an insert 120. The composite sandwich panel 118 includes a core 122 between a first skin 124 and a second skin 126. Within examples, the first skin 124 and the second skin 126 are relatively thin facings, which are coupled on opposing sides of the relatively thicker core 122. As examples, the first skin 124 and the second skin 126 can be formed of laminates of glass, thermoset polymers, carbon fiber-reinforced thermoplastics, or sheet metal. Also, as examples, the core 122 can be formed of an open-cell-structured foam and/or a closed-cell-structured foam such as polyethersulfone, polyvinylchloride, polyurethane, polyethylene or polystyrene foams, syntactic foams, balsa wood, or honeycomb structures (e.g., paper or cardboard formed into honeycomb structures). In this arrangement, the composite sandwich panel 118 can provide a lightweight yet strong panel structure.

As shown in FIGS. 1A-1B, the composite sandwich panel 118 defines a hole 128 extending through the first skin 124, the core 122, and the second skin 126. The hole 128 is an opening that in the first skin 124, the core 122, and the second skin 126. As shown in FIG. 1B, when the composite panel assembly 110 is assembled, the insert 120 is in the hole 128 of the composite sandwich panel 118. In an example, the hole 128 in the composite sandwich panel 118 and the insert 120 each have a circular cross-section. As such, the insert 120 can be inserted in hole 128 in all rotational alignments of the insert 120 relative to the hole 128. This can facilitate easy assembly of the composite panel assembly 110 and reduce (or minimize) the time for assembling the composite panel assembly 110. However, in other examples, the hole 128 and/or the insert 120 can have a non-circular cross-section so that the insert 120 can be inserted in the hole 128 only in a predefined orientation of the insert 120 and the hole 128 relative to each other.

The insert 120 defines a first opening 130 adjacent to the first skin 124, a second opening 132 adjacent to the second skin 126, and a light-transmission channel 134 extending between the first opening 130 and the second opening 132. Additionally, the insert 120 can include an optical lens 136 along the light-transmission channel 134 between the first opening 130 and the second opening 132. The optical lens 136 can assist in transmitting light through the light-transmission channel 134 (e.g., by focusing light transmitted in a direction from the first opening 130 to the second opening 132). In one example, the optical lens 136 can be coupled to the insert 120 by a threaded engagement between one or more threads of the optical lens 136 and one or more threads of the insert 120.

As shown in FIG. 1B, the insert 120 can include an extension portion 138, which extends above the first skin 124 when the insert 120 is fully seated in the hole 128. As described in further detail below, this can help to inhibit (or prevent) ingress of moisture into the light-transmission channel 134. Also, as shown in FIGS. 1A-1B, the first opening 130 is larger than the second opening 132. As such, the light-transmission channel 134 can have an inner surface with one or more sections, which taper inwardly along a direction from the first opening 130 to the second opening 132. This can beneficially allow for greater flexibility in manufacturing tolerances in positioning the printed electronics sheet 112 relative to the insert 120, as described in further detail below with respect to FIGS. 8A-8B. However, the light-transmission channel 134 can have other shapes and/or sizes in other examples.

Additionally, in FIGS. 1A-1B, the composite panel assembly 110 includes a bore 140 in the composite sandwich panel 118. As will be described further below, the bore 140 is generally configured to couple with the fastener 116. The bore 140 is at a position adjacent to the hole 128 in the composite sandwich panel 118. In an example, the bore 140 can terminate in the core 122 (i.e., at a distance from the second skin 126). This can beneficially reduce the number of openings in the second skin 126, which may be visible to consumers and/or users. For instance, in some implementations, the second skin 126 can be a decorative surface visible to consumers and/or users (e.g., a decorative ceiling and/or wall).

As shown in FIGS. 1A-1B, the gasket 114 can be positioned between the composite sandwich panel 118 and the printed electronics sheet 112. The gasket 114 defines an aperture 142. As shown in FIG. 1B, the gasket 114 is on the first skin 124 with the extension portion 138 of the insert 120 in the aperture 142 of the gasket 114. Additionally, in FIG. 1B, the aperture 142 of the gasket 114 extends over the bore 140. This can allow the fastener 116 to extend through the gasket 114 when the fastener 116 is coupled to the composite sandwich panel 118. Although FIGS. 1A-1B depict the gasket 114 as having a single aperture 142 over both the insert 120 and the bore 140, the gasket 114 can include a plurality of apertures 142 such that a first aperture is over the insert 120 and a second aperture is over the bore 140 in alternative examples.

In general, the gasket 114 can provide a physical barrier around the bore 140 and/or the insert 120 to help inhibit (or prevent) ingress of moisture, dirt, and/or dust into the light-transmission channel 134 and/or the bore 140. As examples, the gasket 114 can be made from a foam material and/or a rubber. Additionally, the gasket 114 can have a height that is approximately equal to or greater than a height of the extension portion 138 of the insert 120. In this way, when the fastener 116 is coupled to the composite panel assembly 110, the gasket 114 can engage the fastener 116 to enclose the first opening 130 to the light-transmission channel 134.

The printed electronics sheet 112 includes a light-emitting device 144. As one example, the light-emitting device 144 can include a light-emitting diode (LED). As shown in FIG. 1B, the light-emitting device 144 is at the light-transmission channel 134 and coaxial with the optical lens 136. The printed electronics sheet 112 also includes one or more conductive traces 146 for electrically coupling the light-emitting device 144 to an electrical power source and/or additional light-emitting devices. In some examples, the conductive trace(s) 146 can be formed by, for instance, a screen printing process.

Additionally, the printed electronics sheet 112 can include an aperture 148, which can be aligned with the bore 140 in the composite sandwich panel 118. As described further below, the aperture 148 can be configured to allow the fastener 116 to extend through the printed electronics sheet 112 and couple to the composite panel assembly 110.

As shown in FIGS. 1A-1B, the fastener 116 includes a fastener head 150 and a plug 152. The fastener head 150 has a first side 154 and a second side 156 opposing the first side 154. More particularly, the second side 156 faces the composite panel assembly 110 and the first side 154 faces away from the composite panel assembly 110. In this arrangement, the first side 154 can provide an external surface for a user (e.g., a technician) to press the fastener 116 toward the composite panel assembly 110 during assembly of the system 100.

The fastener head 150 further includes an anchor portion 158 and a retainer portion 160. The plug 152 extends from the anchor portion 158 of the fastener head 150, and is configured to couple the fastener 116 to the bore 140 of the composite panel assembly 110. For example, the plug 152 can include an axial retention structure 162 configured to axially retain the plug 152 in the bore 140 of the composite panel assembly 110. In one implementation, the axial retention structure 162 includes a plurality of teeth 164 extending transversely relative to a longitudinal axis 166 of the plug 152 (as shown in FIG. 1B). The teeth 164 can be configured to engage with (e.g., bite into) the composite sandwich panel 118 as the plug 152 is inserted in the bore 140 to axially retain the plug 152 in the bore 140.

In some examples, the axial retention structure 162 can provide for the plug 152 to be inserted into and coupled to the bore 140 in a non-rotational manner. For example, the plug 152 having the teeth 164 can be axially inserted with or without rotation between the plug 152 and the bore 140. This can facilitate rapid and easy assembly of the system 100 as compared to systems in which rotation between the plug 152 and the bore 140 is required.

However, although configuring the fastener 116 to provide for non-rotational axial insertion can be beneficial, the fastener 116 can be configured to require relative rotation between the plug 152 and the bore 140 in alternative examples. For instance, as one alternative example, the plug 152 can include one or more threads that engage with one or more threads in the bore 140 such that insertion of the plug 152 into the bore 140 requires rotation between the plug 152 and the bore 140. Other examples are also possible.

As shown in FIGS. 1A-1B, the retainer portion 160 extends as a cantilever structure from the anchor portion 158. In this arrangement, the retainer portion 160 is configured to press the light-emitting device 144 toward the light-transmission channel 134 of the composite panel assembly 110 when the plug 152 is axially inserted in the bore 140 of the composite panel assembly 110. By pressing the light-emitting device 144 toward the light-transmission channel 134, the retainer portion 160 can assist in retaining the light-emitting device 144 at the light-transmission channel 134.

Additionally, because the retainer portion 160 extends a cantilever structure from the anchor portion 158, the fastener 116 provides a number of benefits. For example, while the user (e.g., the technician) presses on the anchor portion 158 to couple the fastener 116 to the composite panel assembly 110, the retainer portion 160 can remain visible to the user. As such, the user can better see and perceive the alignment of the retainer portion 160 over the light-emitting device 144 and the insert 120. This can help improve a rate of success in correctly positioning the retainer portion 160 and the light-emitting device 144 in a desired position relative to the first opening 130 of the insert 120. As another example, having the retainer portion 160 extend as a cantilever structure from the anchor portion 158 can allow for a more evenly distributed force to be applied by the fastener head 150 to the light-emitting device 144 during coupling of the fastener 116 to the composite panel assembly 110.

Within examples, the retainer portion 160 of the fastener head 150 can completely cover the first opening 130 of the insert 120. This can help to maintain the light-emitting device 144 in a predetermined position over the light-transmission channel 134, and/or inhibit (or prevent) light generated by the light-emitting device 144 from propagating away from the light-transmission channel 134 at the first opening 130. Additionally, as noted above, by having the retainer portion 160 completely cover the first opening 130 of the insert 120, the fastener head 150 (along with the printed electronics sheet 112 engaged by the fastener head 150) can enclose the light-transmission channel 134 at the first opening 130 and thereby inhibit (or prevent) ingress of moisture, dirt, and/or dust into the light-transmission channel 134.

In some examples, to reduce (or minimize) an amount of material for forming the fastener 116 and/or reduce (or minimize) an amount of space occupied by the fastener 116 in the system 100, the retainer portion 160 can have a size that is approximately equal to an upper surface 168 of the insert 120 at the first opening 130. For instance, the retainer portion 160 can be defined by a radius of curvature that is approximately equal to a radius of curvature of the insert 120 at the first opening 130.

Within examples, the anchor portion 158 can have a size and/or curvature of radius that is different than the size and/or the curvature of radius of the retainer portion 160. For instance, in some implementations, the size and/or the curvature of radius of the anchor portion 158 can be greater than the size and/or the curvature of radius of the retainer portion 160. This may be beneficial, for example, in implementations in which the upper surface 168 of the insert 120 and thus the retainer portion 160 are relatively small and it is desirable to provide a relatively larger anchor portion 158 to provide a greater surface area for the user (e.g., the technician) to press on during insertion of the fastener 116 in the bore 140 of the composite panel assembly 110.

Figure 2A:
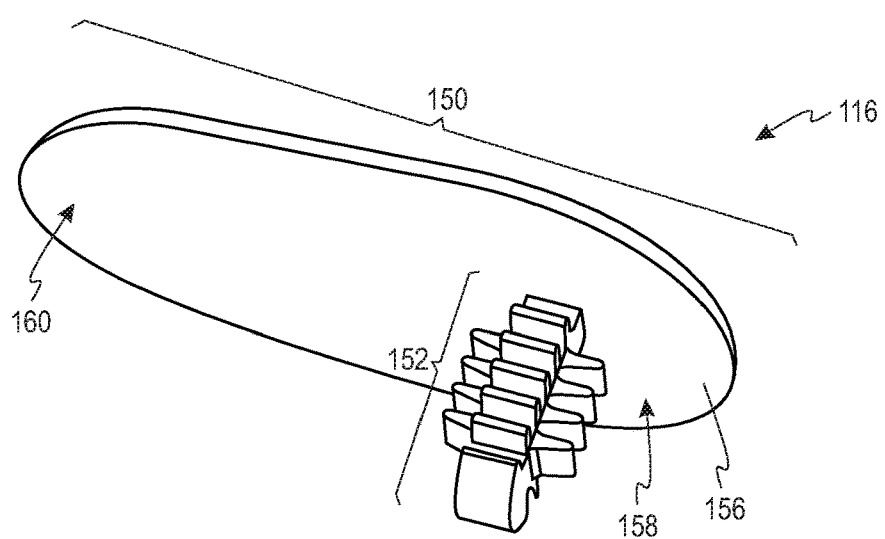
FIG. 2A illustrates a perspective view of a fastener according to an example embodiment.
Figure 2B:
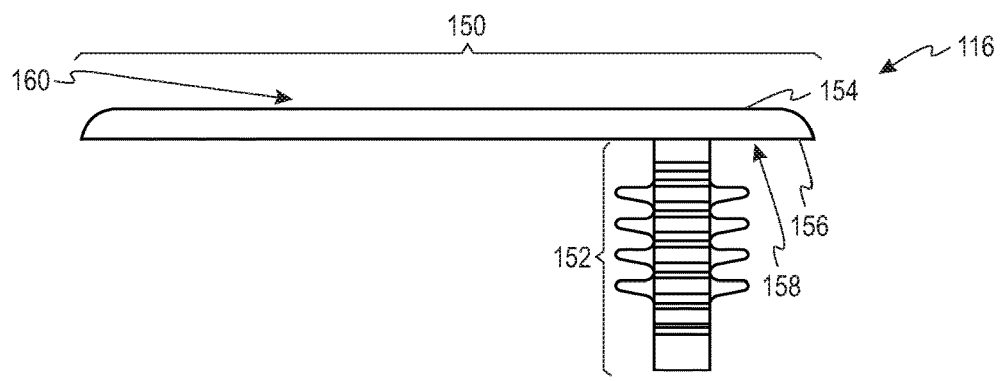
FIG. 2B illustrates an elevation view of the fastener of FIG. 2A, according to an example embodiment.
Figure 2C:
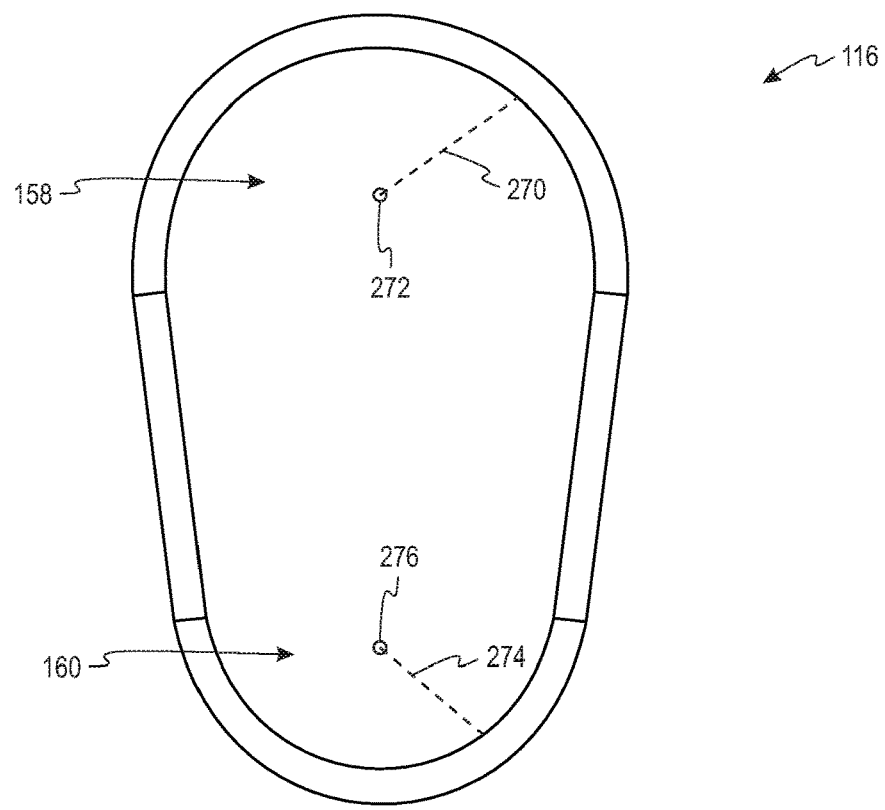
FIG. 2C illustrates a plan view of the fastener of FIG. 2A, according to an example embodiment.

FIGS. 2A-2C depict additional views of the fastener 116 according to an example embodiment. As shown in FIGS. 2A-2C, the anchor portion 158 has a first radius of curvature defined by a first radius 270 and a first focus 272, and the retainer portion 160 has a second radius of curvature defined by a second radius 274 and a second focus 276. Additionally, as shown in FIGS. 2A-2C, the first radius 270 is different than the second radius 274. More specifically, the first radius 270 is greater than the second radius 274 such that the anchor portion 158 has a greater surface area than the retainer portion 160.

Also, as shown in FIGS. 2A-2C, the plug 152 extends from the first focus 272 of the anchor portion 158. This can help to allow the user (e.g., the technician) to better center their finger(s) over the plug 152 and, thus, apply a force more directly to the plug 152 during insertion of the plug 152 in the bore 140 of the composite panel assembly 110.

Although FIGS. 2A-2C depict the size of the anchor portion 158 as being greater than the size of the retainer portion 160, the size of the anchor portion 158 can be approximately equal to or less than the size of the retainer portion 160 in alternative examples.

Figure 3A:
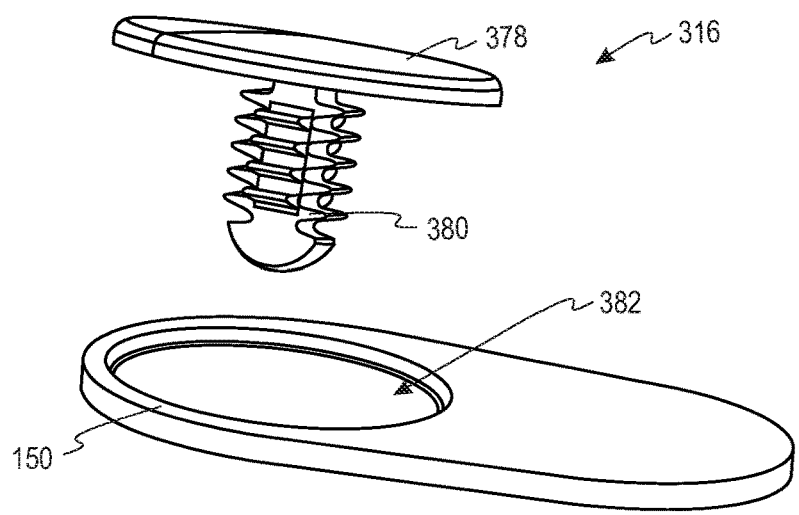
FIG. 3A illustrates an exploded view of a fastener, according to an example embodiment.
Figure 3B:
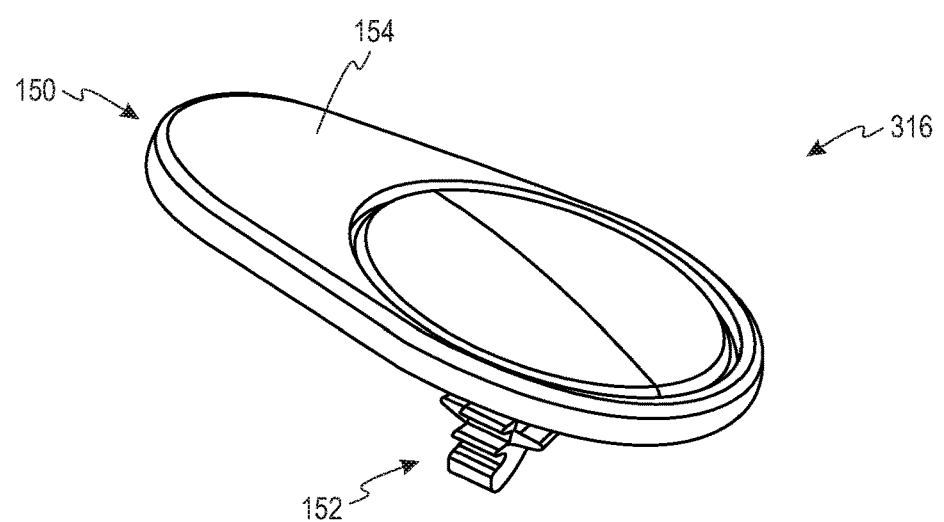
FIG. 3B illustrates a perspective view of the fastener of FIG. 3A, according to an example embodiment.
Figure 3C:
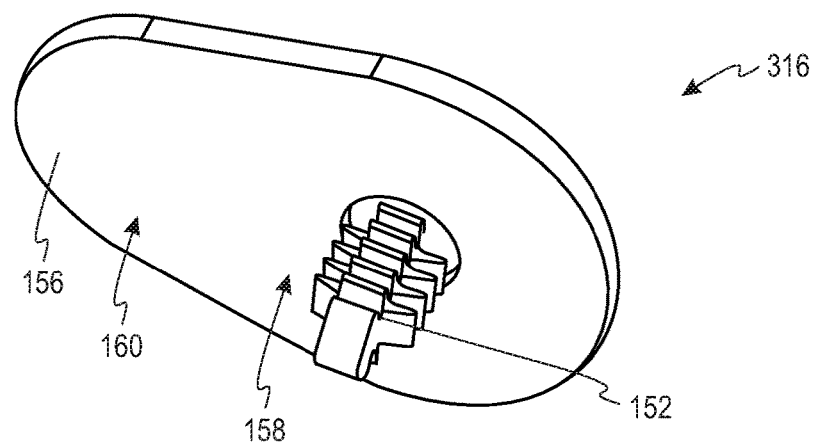
FIG. 3C illustrates another perspective view of the fastener of FIG. 3A, according to an example embodiment.

In FIGS. 1A-2C, the fastener head 150 and the plug 152 are formed as a single, monolithic structure. However, in alternative examples, the fastener head 150 and the plug 152 can be formed as separate structures, which are then coupled to one another. For instance, FIGS. 3A-3C depict a fastener 316 for use in the system 100 according to an example embodiment in which the fastener head 150 and the plug 152 are formed as separate structures. More particularly, FIG. 3A depicts an exploded view of the fastener 316, FIG. 3B depicts a perspective view of the first side 154 of the fastener head 150, FIG. 3C depicts a perspective view of the second side 156 of the fastener head 150.

As shown in FIGS. 3A-3C, the plug 152 includes a plug head 378 and a stem 380. Additionally, the fastener head 150 includes an aperture 382. The plug head 378 has a diameter that is greater than a diameter of the aperture 382. In this arrangement, the plug 152 is coupled to the fastener head 150 with the plug head 378 on the first side 154 of the anchor portion 158 and the stem 380 extending through the aperture 382 to the second side 156 of the fastener head 150. As the diameter of the plug head 378 is greater than the diameter of the aperture 382, the plug head 378 can force the fastener head 150 towards the composite panel assembly 110 to cause the retainer portion 160 to press against the light-emitting device 144 when the stem 380 is coupled to the bore 140 of the composite panel assembly 110.

Figure 4:
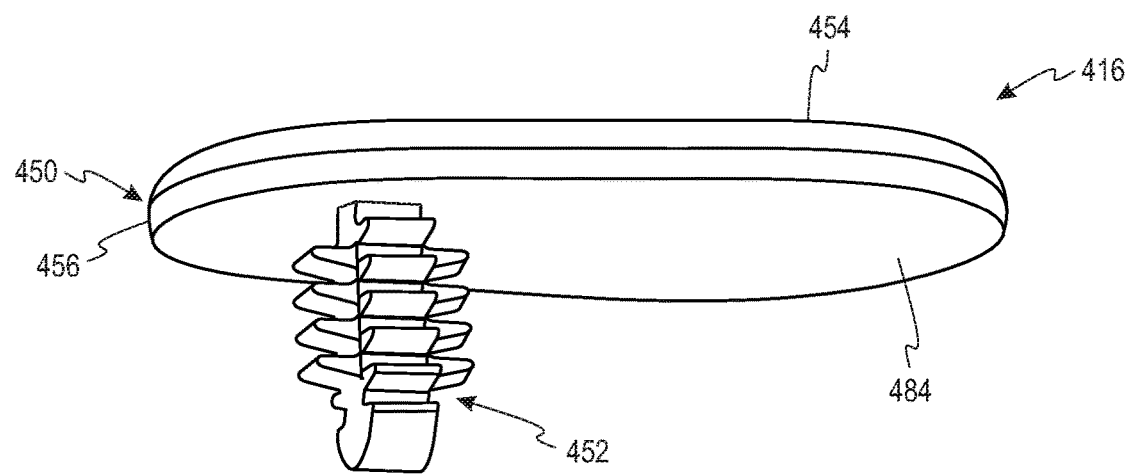
FIG. 4 illustrates a perspective view of a fastener according to an example embodiment.

Referring now to FIG. 4, a fastener 416 is depicted according to another example embodiment. As shown in FIG. 4, the fastener 416 includes a fastener head 450 and a plug 452. As described above, the fastener head 450 has a first side 454 and a second side 456 opposing the first side 454. In FIG. 4, the fastener 416 further includes a fastener gasket 484 on the second side 456 of the fastener head 450, and the plug 452 extends through the fastener gasket 484 on the second side 456 of the fastener head 450.

Within examples, the fastener gasket 484 can be made from a compressible material such as, for instance, a foam material and/or a rubber. Also within examples, the fastener gasket 484 can entirely or partially extend over the second side 456 of the fastener head 450. In general, the fastener gasket 484 can help to more evenly distribute pressure applied by the fastener head 450 to the light-emitting device 144.

Referring now to FIG. 5, an exploded view of the printed electronics sheet 112 is depicted according to an example embodiment. As shown in FIG. 5, the printed electronics sheet 112 can include a trace sheet 586 and a stiffening member 588. The trace sheet 586 can include the conductive traces 146 and the light-emitting device 144. The stiffening member 588 can overlap with the light-emitting device 144 of the printed electronics sheet 112. Overlapping the light-emitting device 144 with the stiffening member 588 can additionally or alternatively help to more evenly distribute pressure applied by the fastener 116, 316, 416 to the light-emitting device 144.

Figure 6A:
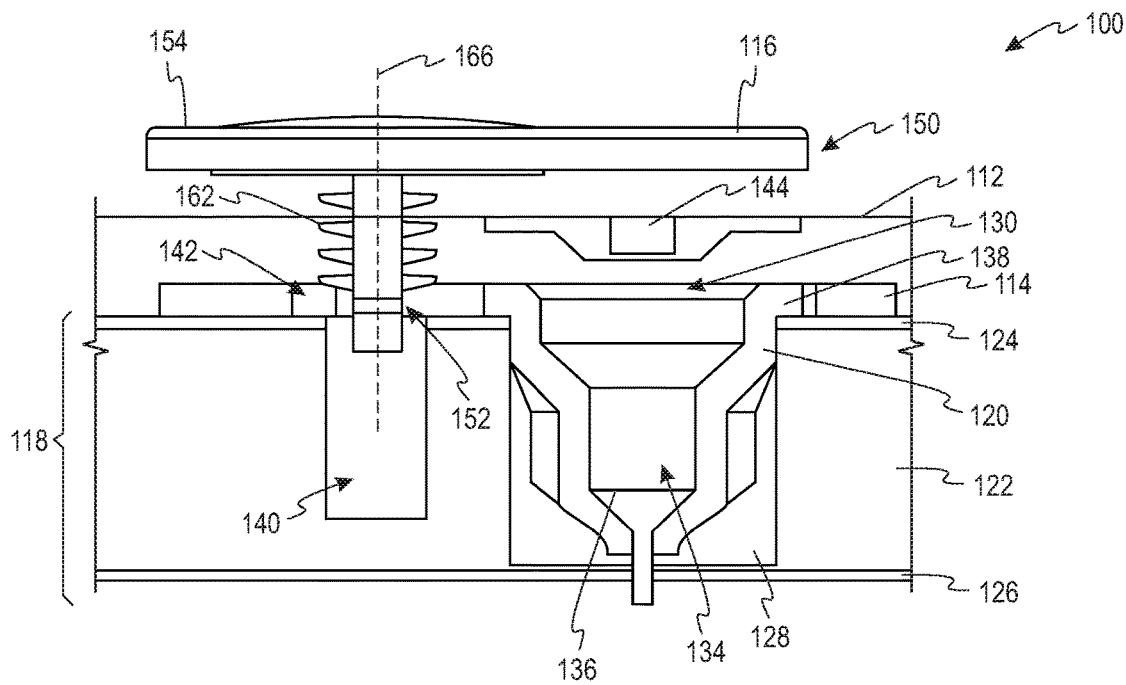
FIG. 6A illustrates a partial cross-sectional view of the system in a first state, according to an example embodiment.
Figure 6B:
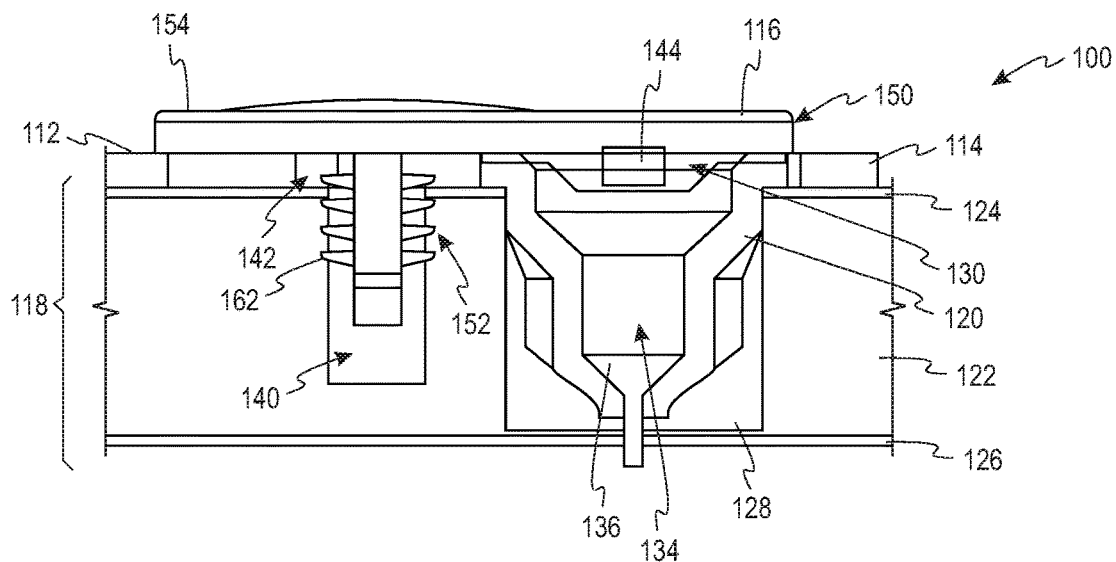
FIG. 6B illustrates a partial cross-sectional view of the system of FIG. 6A in a second state, according to an example embodiment.

Referring now to FIG. 6A and FIG. 6B, the system 100 is shown in a first state and a second state, respectively, according to an example embodiment. More specifically, FIG. 6A depicts the system 100 in the first state prior to coupling the fastener 116 to the composite panel assembly 110, and FIG. 6B depicts the system in the second state after coupling the fastener 116 to the composite panel assembly 110.

As shown in FIG. 6A, the insert 120 is in the hole 128 of the composite sandwich panel 118. The gasket 114 is positioned between the first skin 124 of the composite sandwich panel 118 and the fastener head 150 with the extension portion 138 of the insert 120 and the bore 140 in the aperture 142 of the gasket 114. Also, in FIG. 6A, the printed electronics sheet 112 is positioned with the light-emitting device 144 over the insert 120. The plug 152 extends through the aperture 142 in the gasket 114 and the aperture 148 in the printed electronics sheet 112. The fastener 116 is positioned at a distance over the light-emitting device 144.

To transition the system 100 from the first state to the second state, the fastener 116 can be pressed toward the composite panel assembly 110. For example, as described above, the plug 152 and the bore 140 are configured such that the plug 152 can be coupled to the bore 140 by a non-rotational axial insertion of the plug 152 in the bore 140 in some implementations. In such implementations, the fastener 116 can be pressed toward to the composite panel assembly 110 by applying a force on the first side 154 of the anchor portion 158 along a direction of the longitudinal axis 166 of the plug 152.

In the second state shown in FIG. 6B, the plug 152 is fully seated in the bore 140, thereby coupling the fastener 116 to the composite panel assembly 110. For instance, in FIG. 6B, the plug 152 couples the fastener 116 to the bore 140 of the composite panel assembly 110 due to the engagement between the axial retention structure 162 and the composite sandwich panel 118. Further, when the fastener 116 is coupled to the composite panel assembly 110, the plug 152 extends through the aperture 148 in the printed electronics sheet 112 and the aperture 142 of the gasket 114.

Also, as shown in FIG. 6B, the light-emitting device 144 is in the first opening 130 of the insert 120. More specifically, the light-emitting device 144 is at the light-transmission channel 134 and coaxial with the optical lens 136 in the insert 120. Additionally, the retainer portion 160 of the fastener head 150 completely covers the first opening 130 of the insert 120, and the fastener head 150 also covers the aperture 142 of the gasket 114. In this way, the fastener head 150 and the gasket 114 enclose the insert 120 and light-emitting device 144 and thereby inhibit (or prevent) ingress of moisture, dirt, and/or dust. Further, the retainer portion 160 presses the light-emitting device 144 toward the light-transmission channel 134 to assist in retaining the light-emitting device 144 at the light-transmission channel 134.

In the example described above with respect to FIGS. 1A-6B, the bore 140 of the composite panel assembly 110 is in the composite sandwich panel 118. However, in an alternative example, the bore 140 can be in the insert 120. This can simplify the manufacture of the composite sandwich panel 118.

Figure 7A:
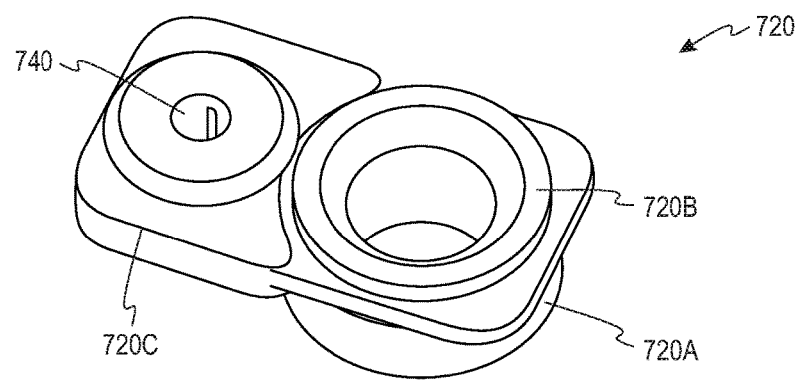
FIG. 7A illustrates a perspective view of an insert according to an example embodiment.
Figure 7B:
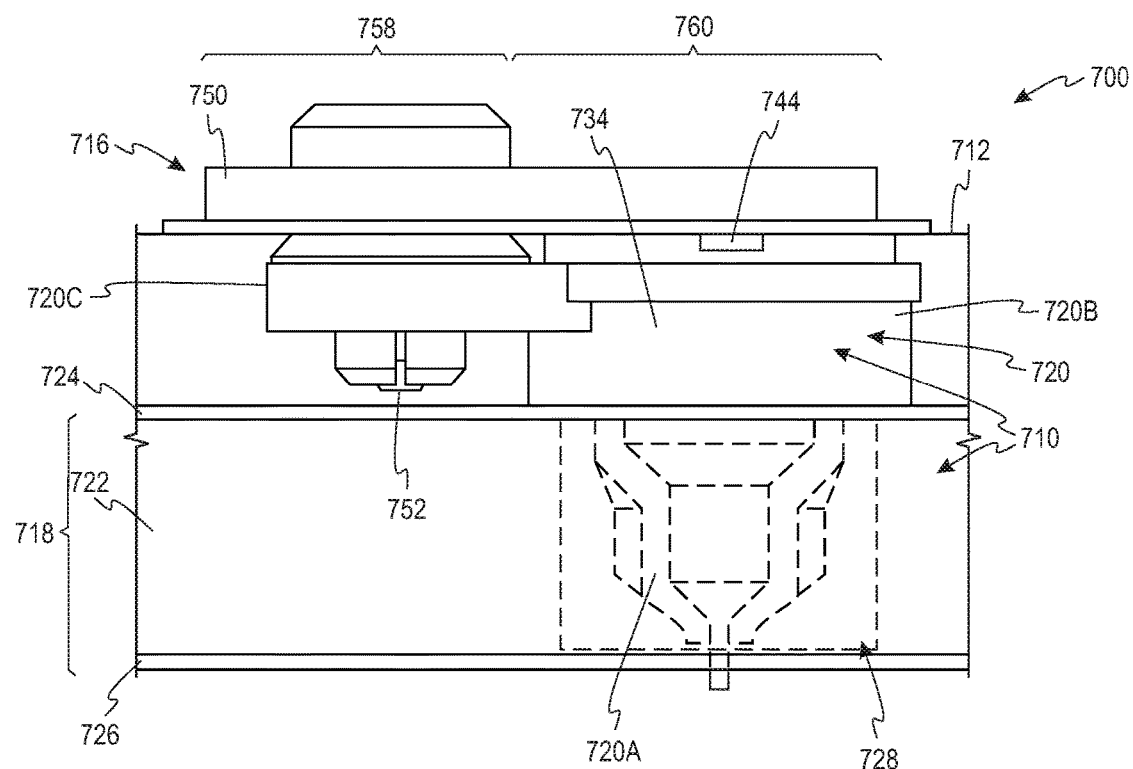
FIG. 7B illustrates a partial cross-sectional view of a system including the insert of FIG. 7A, according to an example embodiment.

As an example, FIG. 7A depicts an insert 720 including a bore 740 to which the plug 152 can be coupled, and FIG. 7B depicts a system 700 including the insert 720 according to an example embodiment. The system 700 is substantially similar to the system 100 described above, except for the insert 720. As such, the system 700 can include a composite panel assembly 710, which includes a composite sandwich panel 718 and the insert 720. The composite sandwich panel 718 includes a core 722 between a first skin 724 and a second skin 726. The composite sandwich panel 718 defines a hole 728 extending through the first skin 724, the core 722, and the second skin 726.

The insert 720 is in the hole of the composite sandwich panel 718 and defines a light-transmission channel 734. As shown in FIGS. 7A-7B, the insert 720 includes (i) a first section 720A in the hole 728 of a composite sandwich panel 718, (ii) a second section 720B extending above a first skin 724 of the composite sandwich panel 718, and (iii) a third section 720C extending laterally from the second section 720B. Additionally, as shown in FIG. 7A, a bore 740 is in the third section 720C of the insert 720.

The system 700 also includes a printed electronics sheet 712, which includes a light-emitting device 744 at the light-transmission channel 734. Additionally, the system 700 includes a fastener 716, which includes a fastener head 750 and a plug 752 as described above. For example, the fastener head 750 includes an anchor portion 758 and a retainer portion 760. The retainer portion 760 can extend as a cantilevered structure from the anchor portion 758. The plug 752 extends from the anchor portion 758 of the fastener head 750 and couples the fastener 716 to the bore 740 of the composite panel assembly 710. Also, as described above, the retainer portion 760 presses the light-emitting device 744 toward the light-transmission channel 734 to assist in retaining the light-emitting device 744 at the light-transmission channel 734.

In some examples, the third section 720C of the insert 720 can rotate relative to the second section 720B of the insert 720. This can provide for greater flexibility if arranging the fastener 716 relative to other components of the system 700 (e.g., conductive traces and/or other fasteners 716).

For ease of description and illustration purposes, FIGS. 1A-4 and 6A-7B are described above and illustrated with a single fastener 116, 416, 716 for securing the light-emitting device 144, 744 to the composite sandwich panel 118, 718. However, within examples, the system 100 and the system 700 can include a plurality of fasteners 116, 416, 716 for securing a plurality of light-emitting devices 144, 744 to the composite sandwich panel 118, 718. For instance, FIGS. 8A-8B depict an example system 800 including a plurality of fasteners 816 for coupling to a plurality of bores 840 and thereby retaining a plurality of light-emitting devices on a printed electronics sheet 812 at respective inserts 820. As shown in FIGS. 8A-8B, the fasteners 816 can be oriented differently relative to each other to facilitate placement of the conductive traces 846 and the light-emitting devices.

As noted above with respect to FIG. 1B, the light-transmission channel 134 of each insert 120, 820 can have an inner surface with one or more sections, which taper inwardly along a direction from the first opening 130 to the second opening 132. This can allow for greater flexibility in manufacturing tolerances regarding the respective locations of the light-emitting devices 144, 744 on the printed electronics sheet 812, while still providing for the light-emitting devices 144, 744 to be positioned at the light-transmission channels 134 of the inserts 120, 820.

Figure 9A:
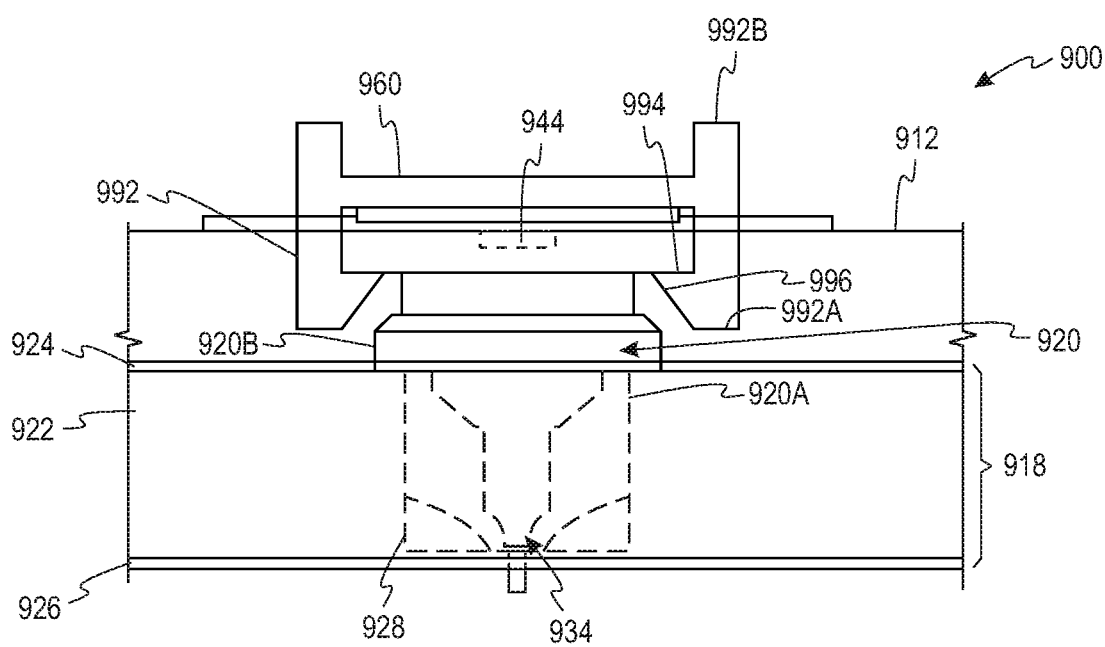
FIG. 9A illustrates a partial cross-sectional view of a system, according to an example embodiment.
Figure 9B:
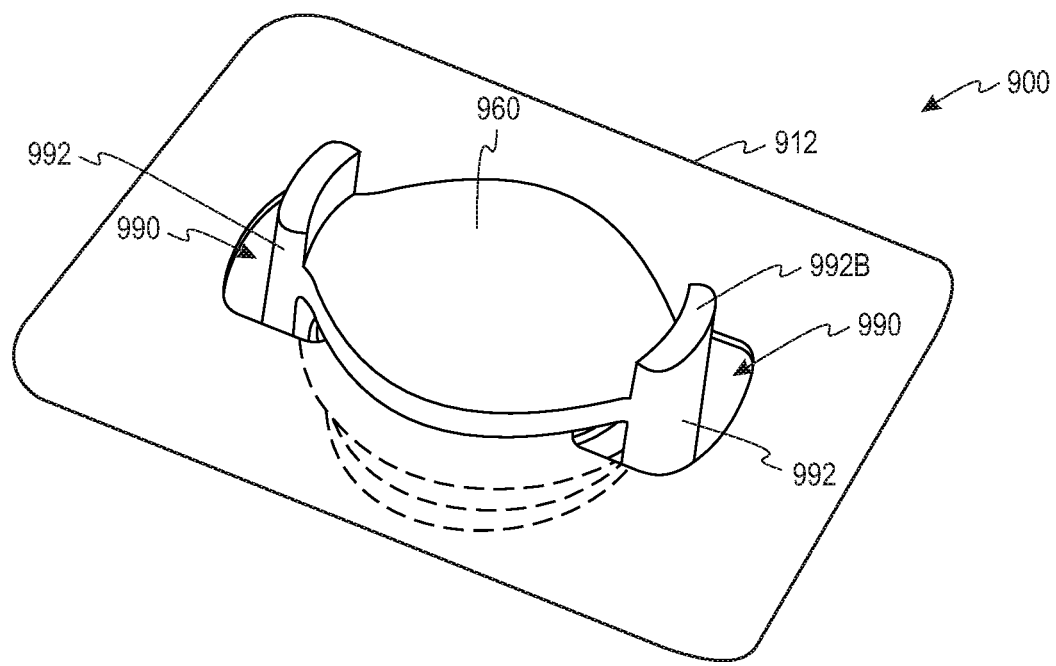
FIG. 9B illustrates a perspective view of the system of FIG. 9A, according to an example embodiment.

Referring now to FIGS. 9A-9B, a system 900 is depicted according to another example embodiment. As shown in FIG. 9A, the system 900 includes a composite sandwich panel 918, an insert 920, a printed electronics sheet 912, and a fastener 916. The composite sandwich panel 918 includes a core 922 between a first skin 924 and a second skin 926. The composite sandwich panel 918 also defines a hole 928 extending through the first skin 924, the core 922, and the second skin 926.

The insert 920 is in the hole 928 of the composite sandwich panel 918, and defines a light-transmission channel 934. The insert 920 includes a first section 920A in the hole 928 of the composite sandwich panel 918 and a second section 920B extending above the first skin 924 of the composite sandwich panel 918.

The printed electronics sheet 912 includes a light-emitting device 944 at the light-transmission channel 934. As shown in FIG. 9B, the printed electronics sheet 912 defines a plurality of apertures 990 on opposing sides of the first section 920A of the insert 920.

The fastener 916 includes a retainer portion 960 and a plurality of resilient arms 992. Each resilient arm 992 extends through a respective one of the apertures 990 in the printed electronics sheet 912 and couples the fastener 916 to the second section 920B of the insert 920. When the fastener 916 is coupled to the insert 920, the retainer portion 960 presses the light-emitting device 944 toward the light-transmission channel 934 to assist in retaining the light-emitting device 944 at the light-transmission channel 934.

The resilient arms 992 include a plurality of spring clips each having a first end 992A and a second end 992B. The second end 992B of each of the resilient arms 992 is configured to be flexed toward the retainer portion 960 to deflect the first end 992A of each of the plurality of resilient arms 992 away from the insert 920 during coupling and decoupling of the fastener 916 and the insert 920. As shown in FIG. 9B, the second section 920B of the insert 920 includes a ledge 994, and the second end 992B of each of the resilient arms 992 includes a hook 996 that engages the ledge 994 when the fastener 916 is coupled to the insert 920.

Accordingly, like the system 700 described above with respect to FIG. 7B, the system 900 shown in FIGS. 9A-9B can beneficially include a single hole 728 in the composite sandwich panel 918 for each light-emitting device of the system 900. Additionally, because the fastener 916 is coupled to the insert 920 at a plurality of points of contact (i.e., at each of the two resilient arms), the fastener 916 can provide a more secure coupling between the fastener 916 and the insert 920 than the fasteners 116, 316, 416 having cantilevered structures coupled at a single point of contact to the composite panel assembly 110.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. A fastener for coupling a light-emitting device to a composite panel assembly, comprising:
   a fastener head including an anchor portion and a retainer portion; and
   a plug extending from the anchor portion of the fastener head, wherein the plug comprises an axial retention structure configured to axially retain the plug in a bore of a composite panel assembly,
   wherein the retainer portion extends as a cantilever structure from the anchor portion, and
   wherein the retainer portion is configured to press a light-emitting device toward a light-transmission channel of the composite panel assembly when the plug is axially inserted in the bore of the composite panel assembly.

2. The fastener of claim 1, wherein the anchor portion has a first radius of curvature defined by a first radius and a first focus,
   wherein the retainer portion has a second radius of curvature defined by a second radius and a second focus, and
   wherein the first radius is different than the second radius.

3. The fastener of claim 2, wherein the plug extends from the first focus of the anchor portion.

4. The fastener of claim 1, wherein the axial retention structure comprises a plurality of teeth extending transversely relative to a longitudinal axis of the plug.

5. The fastener of claim 1, wherein the fastener head and the plug are formed as a single, monolithic structure.

6. The fastener of claim 1, wherein the fastener head comprises an aperture,
   wherein the plug comprises a plug head and a stem, and
   wherein the plug is coupled to the fastener head with the plug head on a first side of the anchor portion and the stem extending through the aperture to a second side of the fastener head.

7. The fastener of claim 1, wherein the fastener head comprises a first side and a second side opposing the first side,
   wherein the fastener further comprises a fastener gasket on the second side of the fastener head, and
   wherein the plug extends through the fastener gasket on the second side of the fastener head.

8. A system, comprising:
   a composite panel assembly comprising:
      a composite sandwich panel comprising a core between a first skin and a second skin, wherein the composite sandwich panel defines a hole extending through the first skin, the core, and the second skin,
      an insert in the hole of the composite sandwich panel and defining a light-transmission channel, and
      a bore in at least one of the composite sandwich panel or the insert;
   a printed electronics sheet comprising a light-emitting device at the light-transmission channel; and
   a fastener comprising:
      a fastener head including an anchor portion and a retainer portion, and
      a plug extending from the anchor portion of the fastener head and coupling the fastener to the bore of the composite panel assembly,
      wherein the retainer portion presses the light-emitting device toward the light-transmission channel to assist in retaining the light-emitting device at the light-transmission channel.

9. The system of claim 8, wherein the hole in the composite sandwich panel and the insert each have a circular cross-section.

10. The system of claim 8, further comprising a gasket between the first skin of the composite sandwich panel and the fastener head,
    wherein the gasket defines an aperture,
    wherein the insert and the plug are in the aperture of the gasket, and
    wherein the fastener head covers the aperture of the gasket.

11. The system of claim 8, wherein the bore is in the composite sandwich panel, wherein the printed electronics sheet includes an aperture aligned with the bore in the composite sandwich panel, and wherein the plug extends through the aperture in the printed electronics sheet.

12. The system of claim 8, wherein the insert comprises (i) a first section in the hole of the composite sandwich panel, (ii) a second section extending above the first skin of the composite sandwich panel, and (iii) a third section extending laterally from the second section, and wherein the bore is in the third section of the insert.

13. The system of claim 8, wherein the insert comprises an optical lens, and wherein the light-emitting device is coaxial with the optical lens.

14. The system of claim 8, wherein the plug and the bore are configured such that the plug is coupled to the bore by a non-rotational axial insertion of the plug in the bore.

15. The system of claim 8, wherein the insert defines an opening, wherein the light-emitting device is in the opening of the insert, and wherein the retainer portion of the fastener head completely covers the opening of the insert.

16. The system of claim 8, further comprising a stiffening member overlapping with the light-emitting device of the printed electronics sheet.

17. The system of claim 8, wherein the printed electronics sheet comprises one or more conductive traces coupled to the light-emitting device, and wherein light-emitting device comprises a light-emitting diode (LED).

18. A system, comprising:

a composite sandwich panel comprising a core between a first skin and a second skin, wherein the composite sandwich panel defines a hole extending through the first skin, the core, and the second skin;

an insert in the hole of the composite sandwich panel and defining a light-transmission channel, wherein the insert comprises a first section in the hole of the composite sandwich panel and a second section extending above the first skin of the composite sandwich panel;

a printed electronics sheet comprising a light-emitting device at the light-transmission channel, wherein the printed electronics sheet defines a plurality of apertures on opposing sides of the first section of the insert; and a fastener comprising a retainer portion and a plurality of resilient arms, wherein each resilient arm extends through a respective one of the plurality of apertures in the printed electronics sheet and couples the fastener to the second section of the insert, and wherein the retainer portion presses the light-emitting device toward the light-transmission channel to assist in retaining the light-emitting device at the light-transmission channel.

19. The system of claim 18, wherein the plurality of resilient arms comprise a plurality of spring clips each having a first end and a second end, and wherein the second end of each of the plurality of resilient arms is configured to be flexed toward the retainer portion to deflect the first end of each of the plurality of resilient arms away from the insert during coupling and decoupling of the fastener and the insert.

20. The system of claim 19, wherein the second section of the insert comprises a ledge, and wherein the second end of each of the plurality of resilient arms comprises a hook that engages the ledge when the fastener is coupled to the insert.

* * * * *